United States Patent Office 3,394,053
Patented July 23, 1968

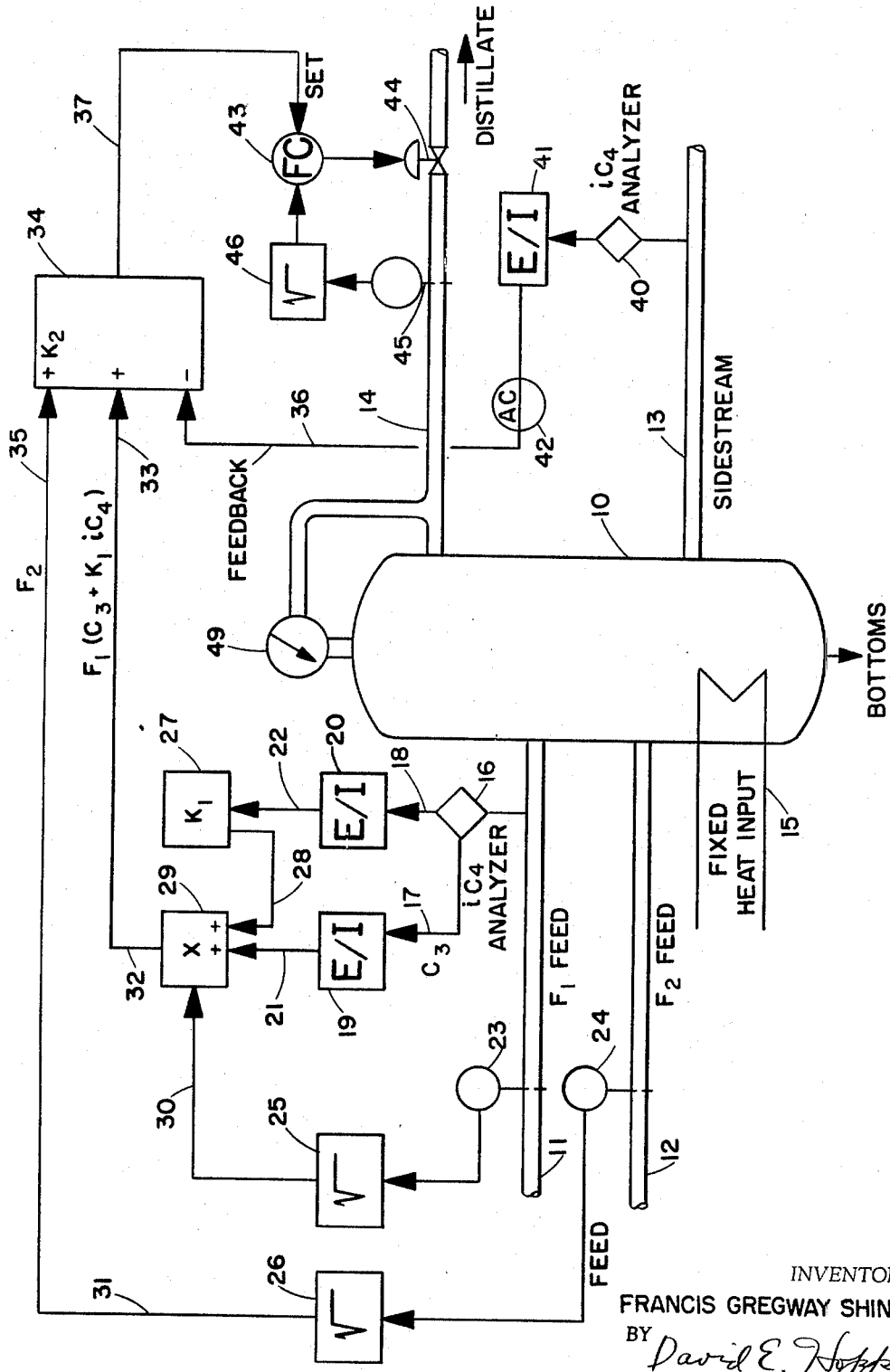

3,394,053
FRACTIONATOR CONTROL SYSTEM WITH MATERIAL BALANCE COMPUTER AND FEEDBACK CONTROL
Francis Gregway Shinskey, Foxboro, Mass., assignor to The Foxboro Company, Foxboro, Mass., a corporation of Massachusetts
Filed Feb. 2, 1965, Ser. No. 429,763
1 Claim. (Cl. 202—160)

ABSTRACT OF THE DISCLOSURE

In a fractionation system, the distillate flow rate is controlled in accordance with a material balance computation: a feedback loop trims the distillate flow rate to maintain the required product composition.

This invention relates to control systems and more particularly to fractionator control systems.

In fractionators having a large number of trays to facilitate isomer splitting, conventional control systems based on control of temperature are not completely adequate. The small difference in boiling point between different isomers does not permit accurate measurement of mixture composition by means of temperature information; further, pressure drop across the trays additionally promotes a tower temperature gradient comparable to the composition temperature gradient. Therefore, practical methods of control have heretofore been limited to manual setting of parameters thought to have the most influence on separation, such as reflux rate and heat input. However, disturbances in these parameters result in a pronounced shift in fractionator material balance and consequent product impurity.

To meet the limitations of the prior art, the present invention is directed to fractionator control based on maintaining a specified material balance. In the illustrated embodiment of the invention, the controlled variable selected is the distillate rate of flow. This variable is not affected by heat input, thus eliminating the amplifying effect of the high reflux ratio upon product purity.

A feed forward system of control is selected as the most satisfactory method of achieving process regulation. In feed forward control the effects of load variations upon the process are computed and the manipulated variable is accordingly altered to cancel these effects. To accomplish such computation, the feed forward control system must include, in effect, a mathematical model of the process having static and dynamic characteristics. In the preferred embodiment of the invention, the feed rate is continuously measured and the feed composition is continuously analyzed, and the process material balance resulting from changes 'herein is computed. The results of the computation are used to control the distillate flow rate, thereby maintaining the desired material balance. The control derived from the static computation is delayed to compensate for fractionator dead time between feed change and the resulting effects upon distillate composition; in addition, this control is amplitude-corrected versus time to compensate for the difference in reaction rates upon the tower output between the measured upset in the fractionator input and the manipulated corrective effects.

Accordingly, an object of this invention is to provide for a process control system having superior regulation thereby insuring a more uniform and higher product purity.

Another object of this invention is to provide for a feed forward control system for fractionator which models the static and dynamic characteristics of the process under control.

Another object of this invention is to regulate a process by maintaining a desired material balance therethrough.

Another object of this invention is to regulate a fractionator by controlling optimum distillate rate in response to feed composition changes.

Another object of this invention is to provide a process control system closely imitating the process mathematically as practicable in order to obtain an optimum response characteristic thereby maintaining uniform product purity regardless of load changes.

Another object of this invention is to provide a fractionator control system based on the calculation of a material balance of propane and isobutane between inputs and outputs of a process.

To compute the material balance a mathematical model of the process must first be derived. Referring to the sole figure, a block diagram of an embodiment of the invention, all the propane ($C_3$) in the feed leaves in distillate stream 14. Isobutane ($iC_4$) leaves in distillate stream 14 except for a small amount in side stream 13. The concentration of $iC_4$ in side stream 13 is to be maintained at 2% of side stream 13 flow, which flow is about ⅕ of the distillate flow rate. Therefore $iC_4$ leaving in the side stream is less than one half percent of total $iC_4$ throughout and can be neglected in the material balance computation.

Feed stream $F_1$, flowing in feed 11 to tower 10, is analyzed for $C_3$ and $iC_4$. Feed stream $F_2$, flowing through feed 12 to tower 10 is supplied with feed of a constant known composition containing a negligible amount of $C_3$; therefore, feed stream $F_2$ is not analyzed. The propane ($C_3$) material balance may be algebraically noted: D (distillate flow)$\times C_{3D}$ (concentration of $C_3$ in the distillate)$= F_1$ (feed $F_1$ flow)$\times C_{3F}$ (concentration of $C_3$ in $F_1$).

The above equations express the fact that the amount of $C_3$ in the distillate over a period of time is equal to the amount of $C_3$ in feed $F_1$ over the same period of time. The equation is more simply written: $D \times C_{3D} = F_1 \times C_{3F}$.

The isobutane ($iC_4$) material balance may be algebraically noted:

D (distillate flow)$\times iC_{4D}$ (concentration of $iC_4$ in the distillate)$= F_1$ (feed $F_1$ flow)$\times iC_{4F}$ (concentration of $iC_4$ in $F_1$)$+ F_2$ (feed $F_2$ flow)$\times X_2$ (estimated concentration of $iC_4$ in $F_2$).

The isobutane ($iC_4$) material balance is calculated as in the case of the propane balance with the additional $iC_4$ present in feed $F_2$ added into the computation. The estimated concentration of $iC_4$ in feed $F_2$ ($X_2$) is a fixed constant to be set into the process control, inasmuch as feed $F_2$ is of constant composition. The above equation is more simply written:

$$D \times iC_{4D} = F_1 \times iC_{4F} + F_2 X_2$$

The distillate in stream 14 contains normal butane ($nC_4$) in addition to $C_3$ and $iC_4$ which must be taken into account in a material balance. Adding the $nC_4$ concentration in the distillate to the previously calculated isobutane balance:

all the butanes out equal all the $iC_4$ in multiplied by $$\frac{\text{all the butanes out}}{iC_4 \text{ out}}$$

The results of the algebraic inclusion of $nC_4$ to include all butanes in the distillate is therefore:

$$D \times (iC_{4D} + nC_{4D}) = (F_1 \times iC_{4F_1} + F_2 X_2) \frac{iC_{4D} + nC_{4D}}{iC_{4D}}$$

That is to say, the total butane flow in the distillate is equal to the total isobutane flow in the feeds $F_1$ and $F_2$ multiplied by the recovery factor or ratio of total butane distillate flow to total isobutane flow in the distillate. This recovery factor, the ratio of total butane out to $iC_4$ out, is a constant for any given tower, and is a function of tower construction, number of trays and like factors. This constant, $$\frac{iC_4 + nC_{4D}}{iC_{4D}}$$

is designated $K_1$ and is set into the process control system computation as a fixed factor.

The recovery factor $K_1$ may be multiplied by the constant $X_2$ (concentration of $iC_4$) in yielding yet another constant which may be designated $K_2$. The constant $K_2$ is also set into the process control system as a fixed factor. Substituting $K_1$ for the recovery factor, the equation becomes:

$$D(iC_4 + nC_{4D}) = F_1 \times iC_{4F} \times K_1 + F_2 X_2 K_1$$

substituting $K_2$ for $K_1 \times X_2$:

$$D(iC_4 + nC_{4D}) = iC_{4F} \times K_1 + F_2 K_2$$

Adding thereto the propane ($C_3$) balance accounts for the entire distillate stream:

$$D = F_1 C_{3F} + F_1 \times iC_{4F} \times K_1 + F_2 K_2$$

or $D = F_1(C_{3F} + iC_{4F} \times K_1) + F_2 K_2$

This last formula is the fractionator material balance which is maintained by the control system functions.

Final long term trim is provided by subtracting the output of the side stream composition controller from this calculated value of D.

On the basis of the mathematical analytical model of the process as set forth above, the embodiment of the invention shown in the figure employs a number of function generators in a configuration affecting the material balance computation and thereby controlling the fractionator to maintain such material balance despite variations in feed flow and composition.

Fractionator 10 has a fixed heat input 15. Feed 11 to fractionator 10 contains variable percentages of $C_3$ and $iC_4$. Analyzer 16 determines the relative concentrations of $C_3$ and $iC_4$. Outputs 17 and 18 of analyzer 16 are voltages respectively representing $C_3$ and $iC_4$ concentrations. Outputs 17 and 18 are converted from voltages to currents by converters 19 and 20 respectively.

Feed 12 to fractionator 10 has a constant composition containing a known concentration of $iC_4$ and a negligible amount of $C_3$. Therefore, no analyzer of feed 12 is necessary for the material balance computation.

Flow rates of feeds 11 and 12 are respectively measured by flow meters 23 and 24. In this embodiment of the invention, orifice meters are employed having outputs proportional to the square of the flow rate. Square root extractors 25 and 26 are employed to convert the respective outputs of the orifice meters 23 and 24 from differential pressure sensing into current outputs 30 and 31 respectively, directly proportional to the metered flow rates of feeds 11 and 12 respectively.

To calculate the first term of the material balance formula, $F_1(C_3 + K_1 \times iC_4)$, output 22 of analyzer 16 and current converter 20 representing $iC_4$ concentration is multiplied by the fixed factor $K_1$ by multiplier station 27. The output 28 of station 27 constitutes the terms $K_1 \times iC_4$. This term is summed with output 21 of analyzer 16 and current converter 19 representing $C_3$ concentration of $F_1$ at the input of multiplier 29, yielding the term $$(C_3 + K_1 \times iC_4)$$

This summed term is multiplied by output 30 of square root extractor 25 which represents the $F_1$ flow rate in feed 11. Thus output 32 of multiplier 29 yields the computation: $F_1(C_3 + K_1 \times iC_4)$. Output 32 is connected to input 33 of lead lag unit 34.

The term $K_2$, a constant, is set into lead lag station 34, and is multiplied by output 31 of square root extractor 26 of flow meter 24 representing flow rate of feed $F_2$. Output 31 is connected to input 35 of lead lag unit 34. The resulting term $K_2 F_2$ is summed with the previously described term at input 33, yielding the resultant equation accounting for propanes and butanes in the distillate stream: $D = F_1(C_3 + K_1 \times iC_4 + K_2 F_2)$.

The absolute representation of this term is trimmed over the long term by subtracting from it the results of $iC_4$ analysis of side stream 13, which constitutes a feedback control correcting for imperfections in the feed forward calculations and deviations in the mathematical model from the process. The $iC_4$ analyzer 40 on side stream 13 has its electrical output converted to current by converter 41 with the output of converter 41 connected through a feedback controller 42 to subtracting input 36 of lead lag unit 34. Thus output 37 of lead lag unit 34 is the complete term:

$$F_1(C_3 + K_1 \times iC_4) + K_2 F_2 - F_B$$

Output 37 of lead lag unit 34 is lagged by a time representing the process dead time, or the difference in time between a feed composition change or flow change and the resulting effect upon the distillate output of the fractionator. In addition, output 37 is dynamically shaped to compensate for the difference in response between a feed change and a distillate change. In most fractionators the response to a feed change deviation would be faster than response to a variation in distillate flow. Such dynamic compensation reduces transient deviations consequent upon variations in the feed. Inasmuch as the dynamic compensation provides for reduction of transient deviations, only an approximation of the requisite dynamic correction is employed for simplicity, inasmuch as an accurate representation of the process dynamics would require an impractical amount of circuitry. Illustrative apparatus for providing dynamic compensation is described in patent to Shinskey filed Jan. 25, 1962, and issued Dec. 20, 1966, as U.S. Patent No. 3,292,852. This apparatus duplicates the dynamic behavior or response of a variety of processing operations, such as evaporation, heat transfer, and the like. Output 37 of lead lag unit 34 is employed to set the control point of flow controller 43 which controls valve 44 on distillate stream 14. Flow meter 45 and square root extractor 46 provide the measured variable input to controller 43. Controller 43 regulates the measured flow to that level set in from lead lag unit 34.

While there has been shown what is considered to be a preferred embodiment of the invention, it will be manifest that many changes and modifications may be made therein without departing from the essential spirit of the invention. It is intended, therefore, in the annexed claim to cover all such changes and modifications as fall within the true scope of the invention.

What is claimed is:

1. A fractionator control system for a fractionator having a fixed heat input thereto comprising;
   a first inlet to said fractionator for feed having variable concentrations of a first component designated $C_3$ and a second component $iC_4$,
   means for measuring the feed flow rate through said first inlet having a first flow rate output signal,
   means for determining the concentration of $C_3$ and the concentration of $iC_4$ of the feed flowing through said first inlet having a $C_3$ concentration output signal and a $iC_4$ concentration output signal,
   a second inlet to said fractionator for feed having a substantially constant known composition and having a concentration of $C_3$ low enough to be neglected in the material balance computation,
   means for measuring the feed flow rate through said second inlet having a second flow rate output signal,
   an outlet for distillate from said fractionator,
   means for multiplying said $iC_4$ concentration output signal by a fixed factor $K_1$ representing the fractionator recovery factor having an output therefrom signifying $iC_4 \times K_1$, means for summing said $C_3$ concentration output signal with said $iC_4 \times K_1$ output having an output therefrom signifying $C_3 + (iC_4 \times K_1)$, means for multiplying said $C_3 + (iC_4 \times K_1)$ output by said first flow rate output signal having an output therefrom signifying $F_1(C_3 + iC_4 \times K_1)$, means for multiplying said second flow rate output signal by a fixed factor $K_2$ representing $K_1$ times the known concentration of $iC_4$ in the feed flowing through said second inlet having an output therefrom signifying $F_2K_2$, means for summing said $C_3 + iC_4 \times K_1$ output with said $F_2K_2$ output having an output therefrom signifying $F_1(C_3 + iC_4 \times K_1) + F_2K_2$, a sidestream outlet from said fractionator, means for determining the $iC_4$ concentration in said sidestream, means for producing a feedback control signal from the deviation in said $iC_4$ concentration in said sidestream from a predetermined set point, means for subtracting said feedback control signal from said $F_1(C_3 + iC_4 \times K_1) + F_2K_2$ output and having an output therefrom, dynamic compensation means responsive to said output of said means for subtracting adapted to compensate for the difference in fractionator response between feed alterations and distillate flow alteration, and means for controlling the rate of said distillate flow responsive to the output of said dynamic compensation means.

References Cited
UNITED STATES PATENTS

| | | |
|---|---|---|
| 2,767,133 | 10/1956 | Shobe. |
| 2,900,312 | 8/1959 | Gilmore. |
| 3,085,153 | 4/1963 | Morgan. |
| 3,130,187 | 4/1964 | Tolin et al. |
| 3,294,648 | 12/1966 | Lupter et al. |
| 3,309,288 | 4/1967 | Butterbaugh. |
| 3,325,377 | 6/1967 | Hacklander. |
| 3,292,852 | 12/1966 | Shinskey _____ 235—200 |
| 3,361,646 | 1/1968 | MacMullan _____ 203—1 |

WILBUR L. BASCOMB, Jr., *Primary Examiner.*